United States Patent [19]
Van Blaricom

[11] Patent Number: 5,685,793
[45] Date of Patent: Nov. 11, 1997

US005685793A

[54] MULTIPLE BAND CONTINUOUSLY VARIABLE TRANSMISSION

[76] Inventor: Terry Michael Van Blaricom, 5525 Halbrent Ave., Sherman Oaks, Calif. 91411

[21] Appl. No.: 698,596

[22] Filed: Aug. 16, 1996

[51] Int. Cl.$^6$ .................................................. F16H 9/16
[52] U.S. Cl. ........................................ 474/33; 474/85
[58] Field of Search .......................... 474/8, 33, 46, 474/84, 85, 146

[56] References Cited

U.S. PATENT DOCUMENTS

| | | | |
|---|---|---|---|
| 2,920,494 | 1/1960 | Dodwell | 474/84 |
| 3,368,728 | 2/1968 | Gudmestad | 474/85 X |
| 3,604,283 | 9/1971 | Vandoorne | 474/85 X |
| 3,981,205 | 9/1976 | Avramidis et al. | 474/85 X |
| 4,581,000 | 4/1986 | Ferfecki | 474/201 |
| 4,643,702 | 2/1987 | Cuypers | 474/201 X |
| 5,127,885 | 7/1992 | Herbert et al. | 474/270 X |
| 5,131,893 | 7/1992 | Herbert | 474/270 X |
| 5,152,723 | 10/1992 | Herbert et al. | 474/272 |
| 5,328,412 | 7/1994 | Durum | 474/245 X |
| 5,399,127 | 3/1995 | Foley et al. | 474/270 |

*Primary Examiner*—Roger J. Schoeppel

[57] ABSTRACT

An Improvement in a multiple band continuously variable transmission that provides equal speed ratios for each band throughout a range of overall transmission speed ratios through the use of radially contoured pulley sheaves.

1 Claim, 3 Drawing Sheets

MULTIPLE BAND CONTINUOUSLY VARIABLE TRANSMISSION

FIELD OF THE INVENTION

This invention relates to transmissions of rotary power, and more particularly to the type of continuously variable transmission that transfers torque between moveable pulley sheaves by a plurality of progressively sized continuous bands.

BACKGROUND OF THE INVENTION

Recent advances in continuously variable transmissions of rotary power have provided substantial improvements in efficiency and service life. In particular, the transmission described in U.S. Pat. No. #5,324,239 issued Jun. 28, 1994 (Van Blaricom) provides a unique and efficient means of transmitting torque at continuously variable speeds. This transmission transfers power between two sets of "V" shaped moveable pulley sheaves by a plurality of continuous bands that are radially dispersed about and operationally joining the moveable sheaves. The bands are sized progressively in circumference so that one may fit inside the other, and in width so that uniform frictional contact can be made with the pulley sheaves. In effecting a change in transmission speed ratio, one set of pulley sheaves are forced closer together and the other further apart. The radius of placement of each band increases on the sheaves that are forced together and decreases on the sheaves that are forced apart. Because the bands are placed one inside the other, they are sized differently in length and must run on different radii about the pulley sheaves. Because they are sized differently in length and run on different radii it can be shown by geometry that they must travel about the pulleys at slightly different speed ratios relative to one another when the overall transmission s ratio is other than one-to-one. This variation in speed ratio from band to band is small in the lower ratios of overall power transmission. In the higher ratios of overall power transmission the variation in speed ratio from band to band increases significantly, resulting in an increased sliding friction at the interface of the bands and pulley sheaves. This sliding friction reduces the efficiency of the transmission and shortens the service life, especially when a large number of bands are used for the purpose of transmitting high torque.

A small number of bands may be used when the torque requirement is relatively low. With the use of a small number of bands the innermost and outermost bands can be spaced relatively close together on their respective radii about the pulley sheaves, making them similar in geometry. Because they are similar in geometry, the variation in speed ratio between bands is small, making the resulting sliding friction of less consequence. When a large number of bands are used for the purpose of transmitting high torque however, the spacing between the innermost and outermost bands must be further apart due to the larger number of bands, resulting in radii of travel that are less similar. The variations in speed ratio between bands becomes more pronounced with a corresponding reduction in efficiency and service life.

While the above described transmission provides a substantially efficient means of providing continuously variable rotary power in the lower overall transmission speed ratios and with a small number of bands, there remains a need for means to reduce or eliminate the variations in speed ratio from band to band so that a large number of bands can be used to provide an increased torque capability without reducing efficiency and service life.

SUMMARY OF THE INVENTION

A primary object of the present invention is to provide an improved efficiency in a multiple band continuously variable transmission.

Another object of the present invention is to provide an improved service life in a multiple band continuously variable transmission.

Another object of the present invention is to provide an improved torque capacity in a multiple band continuously variable transmission.

These and other objectives are achieved in the present invention which provides pulley sheaves with radially contoured faces that operationally force a plurality of bands on to specific radii on the pulley sheaves. During a change in overall transmission speed ratio, the bands follow the contours of the pulley sheave faces. The contoured faces force the bands progressively closer together on the pulley with the smaller radii of band placement, and progressively farther apart on the pulley with the larger radii of band placement. Each band is forced on to radii which by geometry provides substantially the same speed ratio for each band throughout the range of overall transmission speed ratios.

The above objects and features of the invention as well as additional ones are described in detail below with reference to the preferred embodiment which is illustrated in the accompanying drawings.

DESCRIPTION OF THE PREFERRED EMBODIMENT

Figure 3:
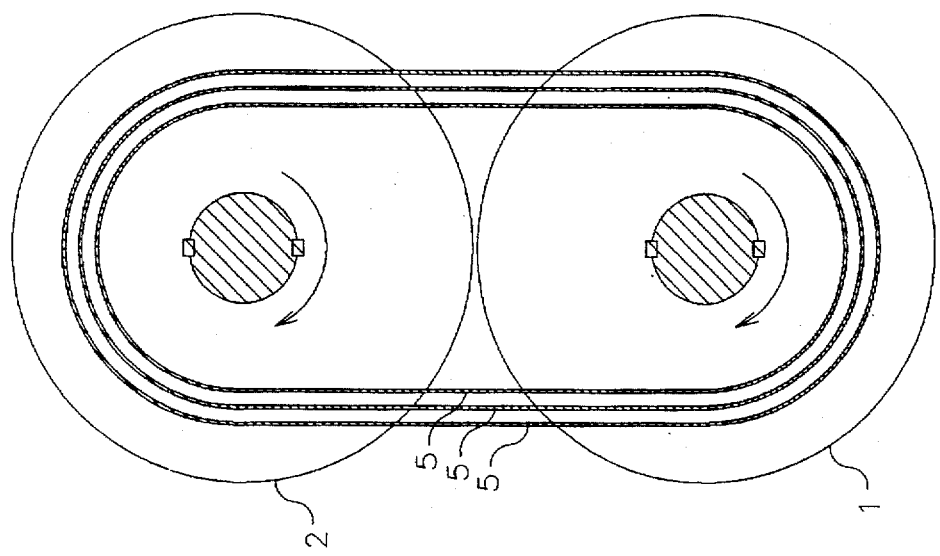
FIG. 3 shows a section through the bands' centerline of a transmission of the prior art at a one-to-one speed ratio.
Figure 2:
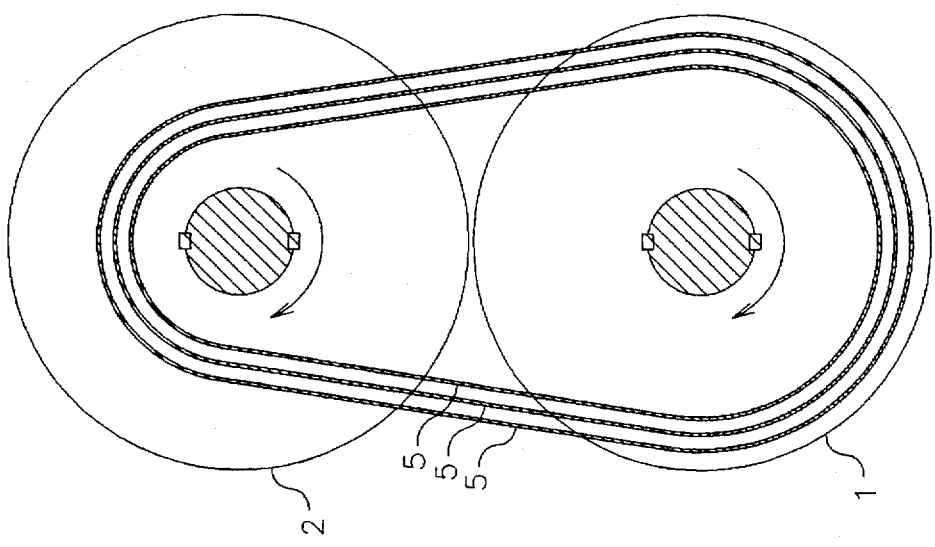
FIG. 2 shows a section through the bands' centerline of a transmission of the prior art at the highest speed ratio. Again three bands of are shown for purposes of clarity.
Figure 1:
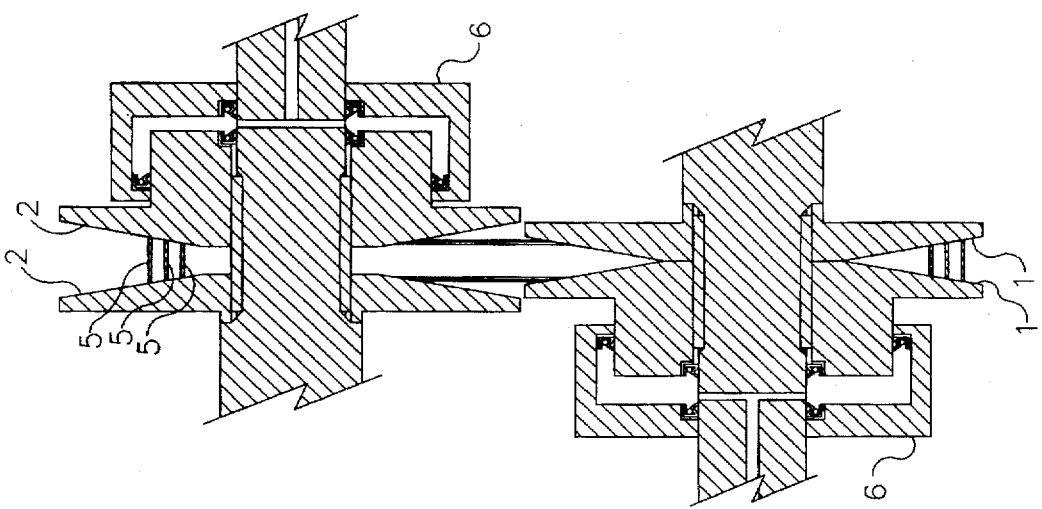
FIG. 1 shows a section through the pulley sheaves' centerline of a transmission of the prior art with pulley sheave faces that have a straight profile. Three bands are shown for purposes of clarity. The positions of the pulley sheaves and bands are shown at the highest speed ratio.

FIGS. 1 through 3 of the drawings show a transmission of the prior art in which the numeral 1 refers to drive pulley sheaves that have faces with a straight profile and the numeral 2 refers to driven pulley sheaves that have faces with a straight profile.

Figure 6:
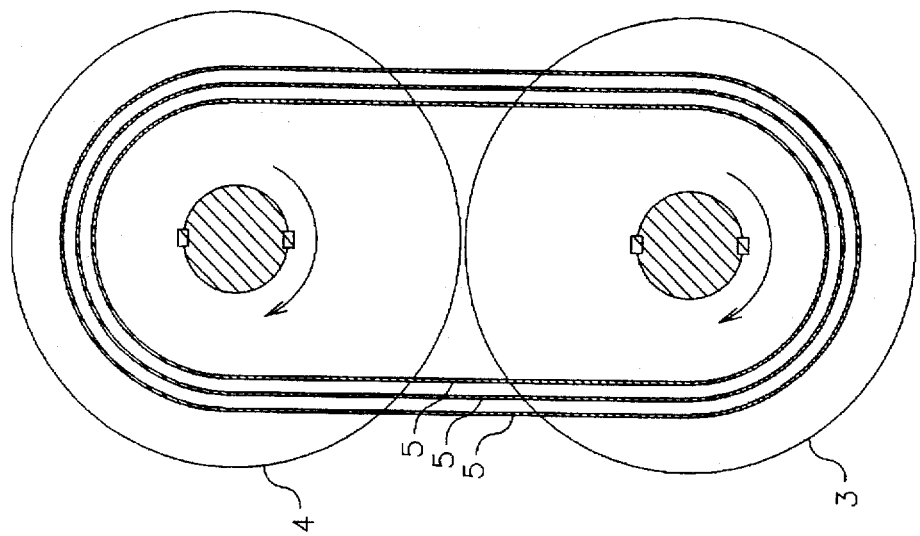
FIG. 6 shows a section through the bands' centerline of a transmission of the present invention showing the positions of the bands at a one-to-one speed ratio.
Figure 5:
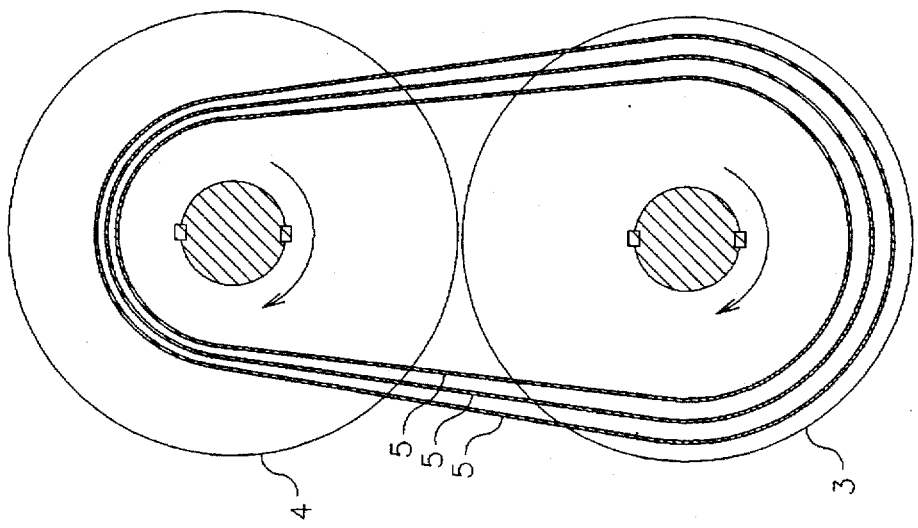
FIG. 5 shows a section through the bands' centerline of a transmission of the present invention showing the positions of the bands at the highest speed ratio. Again three bands are shown for purposes of clarity.
Figure 4:
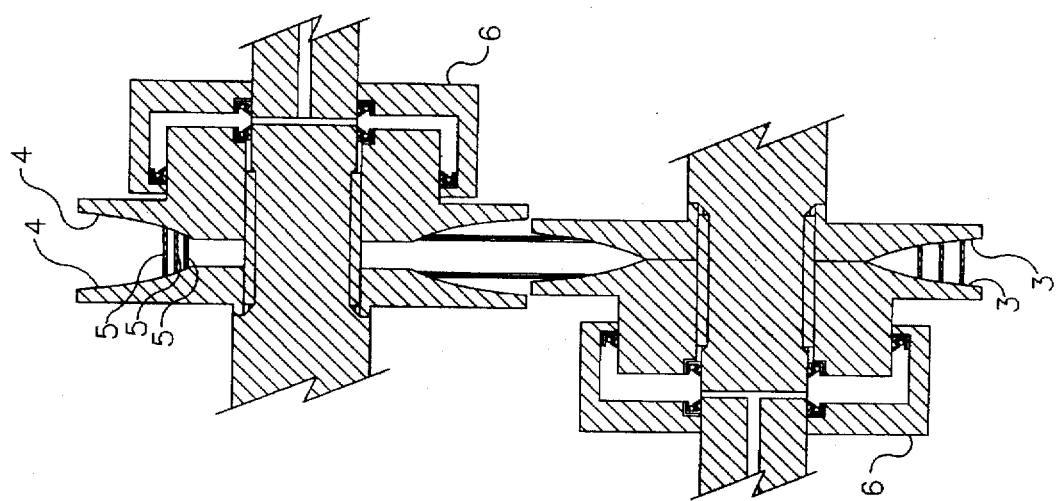
FIG. 4 shows a section through the pulley sheaves centerline of a transmission of the present invention with pulley sheave faces that have a contoured profile. The positions of the pulley sheaves and bands are shown at the highest speed ratio. Three bands are shown for purposes of clarity.

FIGS. 4 through 6 of the drawings show a transmission of the present invention in which the numeral 3 refers to drive pulley sheaves that have faces with a contoured profile and the numeral 4 refers to driven pulley sheaves that have faces with a contoured profile.

Figure 7:
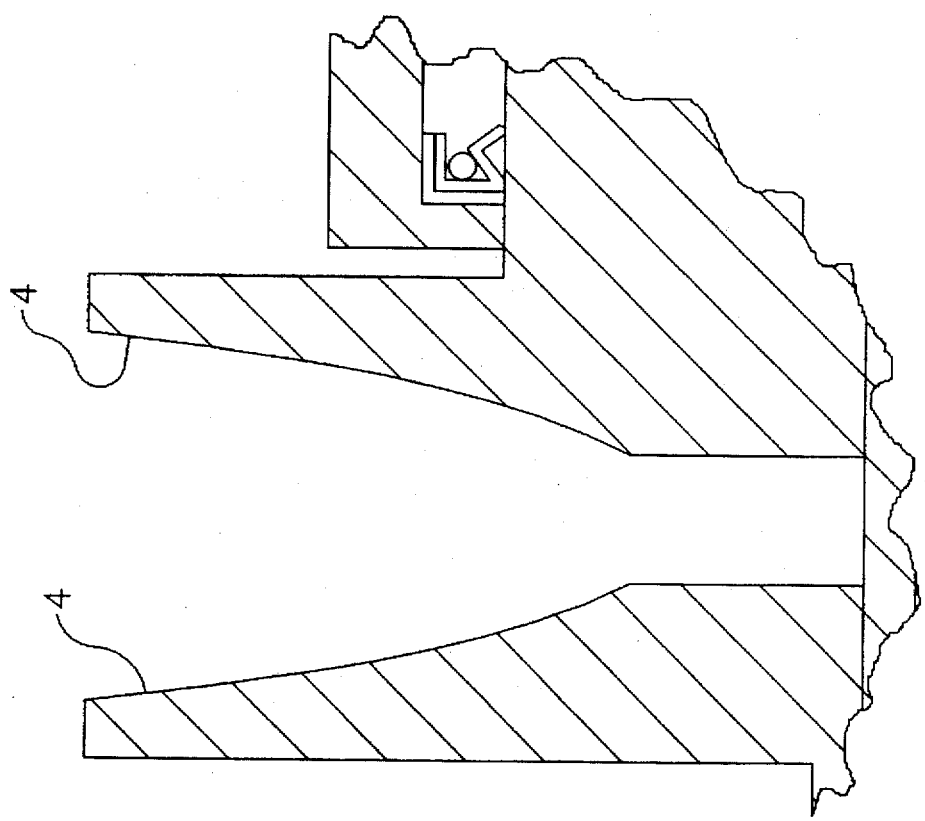
FIG. 7 shows a detail of a section through the driven pulley sheaves' centerline of a transmission of the present invention that illustrates the face profiles of the radially contoured pulley sheaves.

FIG. 7 of the drawings shows a detail of a section through the driven pulley sheaves centerline of the present invention in which the numeral 4 refers to driven pulley sheaves that have faces with a contoured profile.

In FIGS. 1 through 6 of the drawings the numeral 5 shows three bands that are radially dispersed about the drive pulley sheaves and the driven pulley sheaves of their respective transmissions. The bands are placed one inside the other and are sized progressively in width so that uniform frictional contact can be made with the pulley sheave faces.

In FIGS. 1 and 4 of the drawings, the numeral 6 shows hydraulically operated means to slidably move the sheaves closer together or further apart.

Referring to FIG. 3 in which a transmission of the prior art is seen in cross section through the bands centerline at a transmission ratio of one-to-one, the bands 5 are shown to be equally distant from each other on the drive pulley sheaves 1 that have a straight profile and on the driven pulley sheaves 2 that also have a straight profile. It can be shown by geometry that each individual band runs at an exact one-to-one ratio between pulleys when the radial placement of an individual band on the drive pulley sheaves 1 and the driven pulley sheaves 2 is the same. In FIG. 6 a transmission of the present invention is also shown in cross section through the bands' centerline at a transmission ratio of one-to-one. The bands 5 are shown to be at equal distances from each other on the contoured drive pulley sheaves 3 and driven pulley sheaves 4. The radial placement of each band is the same on said sheaves and like the transmission of the prior art the speed ratio between pulleys for each band can be shown by geometry to be one-to-one.

Referring now to FIG. 1 in which a cross section of a transmission of the prior art is shown through the pulley sheaves' centerline, the transmission is shown at the highest overall speed ratio. The straight profiles of the pulley sheaves have forced the bands 5 on to radii that are equal distances apart on both the drive pulley sheaves 1 and the driven pulley sheaves 2. The equal spacing of the bands 5 may also be seen in FIG. 2, which is a cross section of a transmission of the prior art through the bands' centerline that is also at the highest overall speed ratio. Because the bands 5 are spaced equal distances from each other, it may be shown by geometry that said bands do not run at equal speed ratios relative to each other. They can only run at equal speed ratios when the overall transmission speed ratio is one-to-one as shown in FIG. 3. At overall transmission speed ratios that are other than one-to-one the ratio of the radius of placement on the drive pulley sheaves 1 and the radius of placement on the driven pulley sheaves 2 becomes different for each band. In operation these differences in the ratio of band placement radii cause differences in the speed ratio from band to band, which results in sliding friction at the interface of the bands and the pulley sheave faces. This sliding friction causes wear and reduces the efficiency of the transmission.

Referring now to FIG. 7 which shows a section through the driven pulley sheaves centerline of a transmission of the present invention, the numeral 4 shows driven pulley sheaves each with a specifically contoured face profile. Said specifically contoured face profile approximates certain portions of an ellipse. This profile can be more accurately described in the preferred embodiment by the quadratic equation $y=6.5654X^3+10.899X^2+8.137X+0.0002$, where X and Y are zero at the point on the profile where the center-most band runs when the transmission is at a one-to-one ratio. The above described profile is a mirror image on each opposing sheave half, and the driving and the driven pulley sheaves have the same profiles. FIG. 4 shows a transmission of the present invention at the highest overall speed ratio. The contoured faces of the drive pulley sheaves 3 and the driven pulley sheaves 4 have forced the bands 5 on to radii that are a greater distance apart on the drive pulley sheaves 3 than on the driven pulley sheaves 4. It may be shown by geometry that the ratio of the radii of placement on the drive pulley sheaves 3 and the radii of placement on the driven pulley sheaves 4 is substantially the same for each band. Because the ratios of the radii of band placement are substantially equal, the bands 5 run at substantially equal speed ratios between pulleys relative to each other. In the transmission of the present invention this may be said to be true at all overall speed ratios. The greater distances between the bands 5 on the drive pulley sheaves 3 relative to the driven pulley sheaves 4 can also be seen in FIG. 5, which is a section through the bands' centerline of a transmission of the present invention which is also at the highest overall speed ratio. The distances between the bands 5 of the present invention are also slightly progressive at ratios other than one-to-one, however the progression is slight and is therefore not illustrated in the drawings. Also not illustrated are the positions of the bands 5 at the lowest overall speed ratio, which is simply a reversal of the bands' positions on the pulleys at the highest overall speed ratio. Because the individual bands of the present invention run at substantially equal speed ratios between pulleys throughout the range of overall transmission speed ratios, the wear and inefficency caused by sliding friction is substantially eliminated.

The above described embodiment of the subject invention uses pulley sheave face contours in which the determining profile has been described herein by a quadratic equation. It is conceivable that others may improve upon these contours to provide additional enhancements to the operation of the transmission.

It is also conceivable that a contour be provided to only one sheave half per pulley set to provide equal ratios between bands.

It is also conceivable that the drive sheaves and the driven sheaves be sized differently, with different but complimentary sheave contours to provide equal ratios between bands.

Additional embodiments of this invention will be conceived by others, therefore it is intended that the scope of the invention be limited only by the following claims, and not by the embodiments described above. Reference should be made to the following claims in determining the full scope of the invention.

What is claimed is:

1. An improvement in a multiple band transmission that is continuously variable in speed ratio, said transmission comprising;

a pair of driving sheaves;

a pair of driven sheaves;

a means to slidably move at least one of said driving and one of said driven sheaves;

a plurality of continuous bands radially dispersed about and operationally joining said driving and said driven sheaves, said plurality of continuous bands being sized progressively in circumference so that one may fit inside another and progressively in width so that uniform frictional contact can be made with said driving and said driven sheaves;

said improvement comprising;

radially contoured means on said driving and said driven sheaves to operationally effect the placement of said plurality of continuous bands on to specific radii on said driving and said driven sheaves;

whereby;

the ratio of the radius of placement of an individual band on said driving sheaves to the radius of placement of said individual band on said driven sheaves is substantially the same as the ratio of the radii of placement of any other of said plurality of continuous bands throughout a range of overall transmission speed ratios.

* * * * *